United States Patent
Arsenault et al.

(10) Patent No.: US 8,769,586 B2
(45) Date of Patent: Jul. 1, 2014

(54) METHOD AND APPARATUS FOR CONDITIONALLY PROCESSING, STORING, AND DISPLAYING DIGITAL CHANNEL CONTENT IN A TELEVISION RECEPTION SYSTEM

(75) Inventors: Robert G. Arsenault, Redondo Beach, CA (US); Tam T. Leminh, Cypress, CA (US); Craig A. Finseth, St. Paul, MN (US); Jeffrey A. Brown, Roseville, MN (US); Philip E. Hsiao, Eden Prairie, MN (US)

(73) Assignee: The DIRECTV Group, Inc., El Segundo, CA (US)

( * ) Notice: Subject to any disclaimer, the term of this patent is extended or adjusted under 35 U.S.C. 154(b) by 484 days.

(21) Appl. No.: 12/643,736

(22) Filed: Dec. 21, 2009

(65) Prior Publication Data
US 2010/0100909 A1    Apr. 22, 2010

Related U.S. Application Data

(62) Division of application No. 09/534,708, filed on Mar. 24, 2000, now abandoned.

(60) Provisional application No. 60/126,576, filed on Mar. 29, 1999, provisional application No. 60/126,686, filed on Mar. 29, 1999.

(51) Int. Cl.
*H04N 7/20*    (2006.01)

(52) U.S. Cl.
USPC ............................ 725/70; 725/39; 725/63

(58) Field of Classification Search
USPC ............. 725/68, 69, 70, 71, 37–39, 40, 135
See application file for complete search history.

(56) References Cited

U.S. PATENT DOCUMENTS

| | | | |
|---|---|---|---|
| 5,038,211 A * | 8/1991 | Hallenbeck | 348/460 |
| 5,381,477 A * | 1/1995 | Beyers et al. | 380/231 |
| 6,157,948 A * | 12/2000 | Inoue et al. | 709/219 |
| 6,160,545 A * | 12/2000 | Eyer et al. | 715/721 |
| 6,289,396 B1 * | 9/2001 | Keller et al. | 719/323 |
| 6,751,401 B1 * | 6/2004 | Arai et al. | 725/40 |
| 2001/0056577 A1 * | 12/2001 | Gordon et al. | 725/52 |
| 2002/0133820 A1 * | 9/2002 | Arai et al. | 725/39 |
| 2004/0022104 A1 * | 2/2004 | Inoue et al. | 365/202 |
| 2005/0278741 A1 * | 12/2005 | Robarts et al. | 725/46 |

* cited by examiner

*Primary Examiner* — Brian T Pendleton
*Assistant Examiner* — Alan Luong

(57) ABSTRACT

Content used in creating an electronic program guide and/or channels for a television reception system is delivered to a local receiving device, such as a direct to home satellite receiver, as individual digital objects. Rules (i.e., conditional expressions) may be embedded in the digital objects to allow different actions in different situations. These rules can be used to determine whether an object should be stored, which objects should be included in an electronic program guide, and/or what content should be used to create a particular channel.

21 Claims, 6 Drawing Sheets

METHOD AND APPARATUS FOR CONDITIONALLY PROCESSING, STORING, AND DISPLAYING DIGITAL CHANNEL CONTENT IN A TELEVISION RECEPTION SYSTEM

CROSS-REFERENCES TO RELATED APPLICATION

This application is a divisional of U.S. patent application bearing Ser. No. 09/534,708, filed Mar. 24, 2000, entitled "Method and Apparatus for Conditionally Processing, Storing, and Displaying Digital Channel Content in a Television Reception System", inventors: Robert G. Arsenault, Tam T. Leminh, Craig A, Finseth, Jeffrey A. Brown and Philip E. Hsiao, which claims priority from provisional application Ser. No. 60/126,576, filed Mar. 29, 1999, and provisional application Ser. No. 60/126,686, filed Mar. 29, 1999, both of which are hereby incorporated by reference.

TECHNICAL FIELD OF THE INVENTION

The present invention relates in general to processing, storing, and/or displaying digital information and in particular to conditionally processing, storing and/or displaying digital program guide objects in a broadcast satellite television system based on the evaluation of a logical rule embedded in the digital object.

BACKGROUND OF THE INVENTION

Television programs are distributed to viewers by a variety of broadcasting methods. These methods include traditional analog broadcast television (National Television Systems Committee or "NTSC" standard), the upcoming digital broadcast television (Advanced Television Systems Committee or "ATSC" standard), cable television (both analog and digital), satellite broadcasting (both analog and digital), as well as other methods. Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas.

The receiver unit in a satellite system typically includes a satellite dish connected by a cable to an integrated receiver/decoder unit (IRD). The receiver unit receives and processes transmitted information packets. The satellite dish is aimed toward the satellite, and the IRD is connected to the user's television in a fashion similar to a conventional cable-TV decoder.

Along with the audio and video signals associated with the television channels, the IRD receives various digital objects such as text and graphics. These objects may be used by the IRD to provide the user with additional information such as electronic program guides, instructional manuals, advertisements, etc. The program guide information includes a set of channel definition parameters that define which portions of the transmitted television content are associated with the various channels, and typically also includes schedule information for display on users' televisions. The schedule information informs users what television programs are currently on, and what television programs will be shown in the near future.

Certain digital objects are only used in certain scenarios. For example, electronic program guide data about a particular premium channel need only be displayed if the user subscribes to that pay channel. Similarly, instructions on how to use brand X IRD need never be displayed by a brand Y IRD. Accordingly, the IRD needs to know which objects to store and which to objects to use in which scenarios.

Typically, each IRD is equipped with a conditional access module (CAM). The CAM stores a plurality of flags representing predefined scenarios (i.e., a bit mask). For example, a flag may indicate whether a particular user subscribes to a particular premium channel. Accordingly, the digital objects are transmitted with certain flags set and these flags are compared to the plurality of flags stored in the CAM to determine if an object should be discarded or displayed.

However, this method has certain drawbacks. Only predefined (i.e., before the IRD is shipped) scenarios may be used, because the meaning of each flag is predefined. The large number of combinations is to difficult to anticipate ahead of time (e.g., whether a particular IRD is brand X with at least 512 kilobytes of memory). Further, certain scenarios are too new to anticipate in older units (e.g., whether a particular IRD is Java compatible). Further, in receivers having the capability of modifying the control software within the receiver (e.g., by means of an upgrade received as part of a broadcast stream), the features may change over time.

SUMMARY OF THE INVENTION

Accordingly, the present invention provides a method and apparatus for processing conditional objects. Conditional objects contain rules (e.g., expressions in an interpreted language) that test for various scenarios and take the appropriate action. For example, a particular brand of IRD need only store objects it needs to conserve memory (e.g., discard help pages for other brands of IRDs). Similarly, a particular IRD may only display electronic program guide objects and/or channel content that is appropriate for the current circumstances.

In accordance with one aspect of the invention, an apparatus for conditionally processing digital objects addressed to a receiver/decoder in a satellite television system is provided. The apparatus comprises a satellite signal receiver for receiving a digital object, a memory for storing the digital object, and a control circuit operatively coupled to the receiver and the memory. The control circuit determines if the digital object is a conditional object, wherein conditional objects are objects which include a rule and an embedded object. If the digital object is a conditional object, the control circuit logically separates the embedded object from the rule and evaluates the rule to determine how the digital object should be processed.

In some embodiments, the control circuit discards the digital object to conserve memory if the rule evaluates to false, and the control circuit stores the digital object in the memory if the rule evaluates to true. In other embodiments, the control circuit displays the digital object if the rule evaluates to true, and waits a period of time before re-evaluating the rule if the rule evaluates to false. In such an instance, the period of time may be a predetermined period of time or the period of time may be determined by a variable in a rule being updated. In certain embodiments, the digital object is used to construct a television program guide and/or to compose the content a television channel.

In accordance with another aspect of the invention, a method is disclosed for conditionally storing digital objects. The method begins by retrieving a digital object from memory. Subsequently, the method determines if the digital object is a conditional object, wherein conditional objects are objects which include a rule and an embedded object, the rule indicating if the embedded object should be discarded. If the digital object is a conditional object, the embedded object is logically separated from the rule, and the rule is evaluated to determine if the digital object should be discarded or displayed.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Although the following description focuses on the processing, storage, and display of digital objects used to compose channel displays and electronic television program guides in a broadcast satellite system, persons of ordinary skill in the art will readily appreciate that the techniques of the present invention are in no way limited to satellite broadcasts or program guides. To the contrary, any system which might benefit from improved efficiency in memory usage and flexible digital displays may employ the techniques described herein.

In general, television signal distribution systems rely on either a cable network or on free-space propagation for delivering television signals to individual users or subscribers. Cable-based television systems transmit one or more individual television signals or "channels" over a wire, while free-space propagation systems transmit one or more channels over-the-air, i.e., in a wireless manner. Most large-scale cable and wireless television signal distribution systems broadcast a broadband television signal having a plurality of individual television signals or channels modulated onto one or more carrier frequencies within a discernible frequency band.

Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas.

Typically, satellite systems include a receiver for receiving and processing transmitted waveforms. One type of receiver is part of a "wireless digital television" system which is utilized by the DIRECTV® broadcast service. The DIRECTV® and similar systems allow consumers to receive a large number of television channels broadcast directly to their home from one or more geosynchronous satellites.

Figure 1:
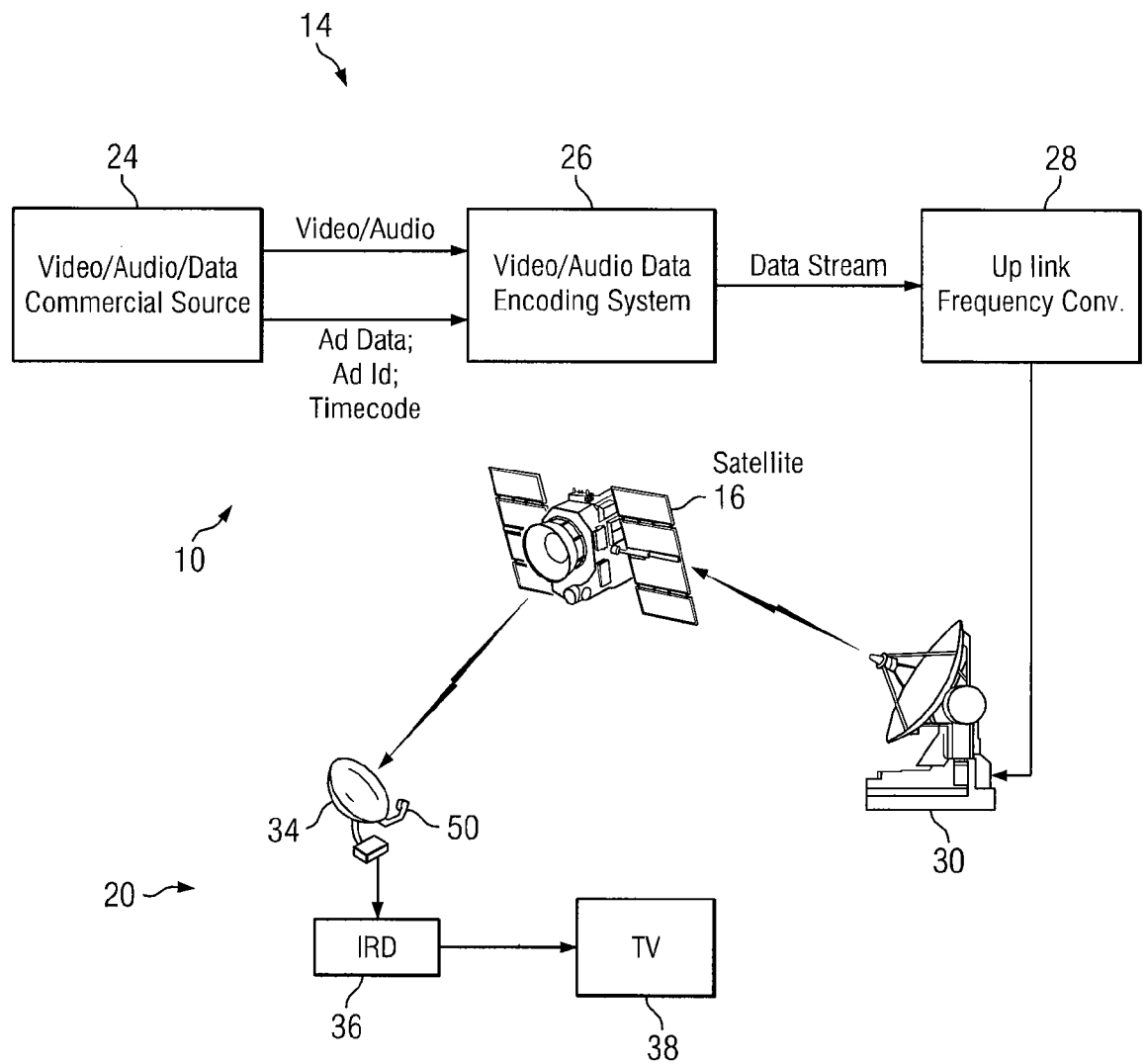
FIG. 1 is a block diagram of a direct broadcast satellite system.

A block diagram of an exemplary transmission and reception system 10 is illustrated in FIG. 1. The system 10 includes a transmission station 14, a relay 16, and a plurality of receiver stations 20. A wireless signal provides the communications medium between the transmission station 14, the relay 16, and the receiver station 20. The transmission station 14 includes a programming/data source 24, a video/audio/data encoding system 26, an uplink frequency converter 28, and an uplink satellite antenna 30. The relay 16 is preferably at least one geosynchronous satellite. The receiver station 20 includes a satellite reception antenna 34 which may include a low-noise-block (LNB) 50, a receiver unit (or IRD) 36 connected to the LNB 50, and a television monitor 38 connected to the receiver unit 36.

In operation, the transmission station 14 can receive video and audio programming from a number of sources, including satellites, terrestrial fiber optics, cable, or tape. Preferably, the received programming signals, along with data signals such as electronic scheduling data and conditional access data, are sent to the video/audio/data encoding system 26 where they are digitally encoded and multiplexed into a packetized data stream using a number of conventional algorithms, including convolutional error correction and compression. In a conventional manner, the encoded data stream is modulated and sent through the uplink frequency converter 28 which converts the modulated encoded data stream to a frequency band suitable for reception by the satellite 16. Preferably, the satellite frequency is Ku-band. The modulated, encoded data stream is then routed from the uplink frequency converter 28 to an uplink satellite antenna 30 where it is broadcast toward the satellite 16. The satellite 16 receives the modulated, encoded Ku-band data stream and re-broadcasts it downward toward an area on earth that includes the various receiver stations 20. The LNB 50 of the satellite antenna 34 of the receiver station 20 shifts the Ku-band signal down to an L-band signal which is transmitted to the receiver unit 36.

Figure 2:
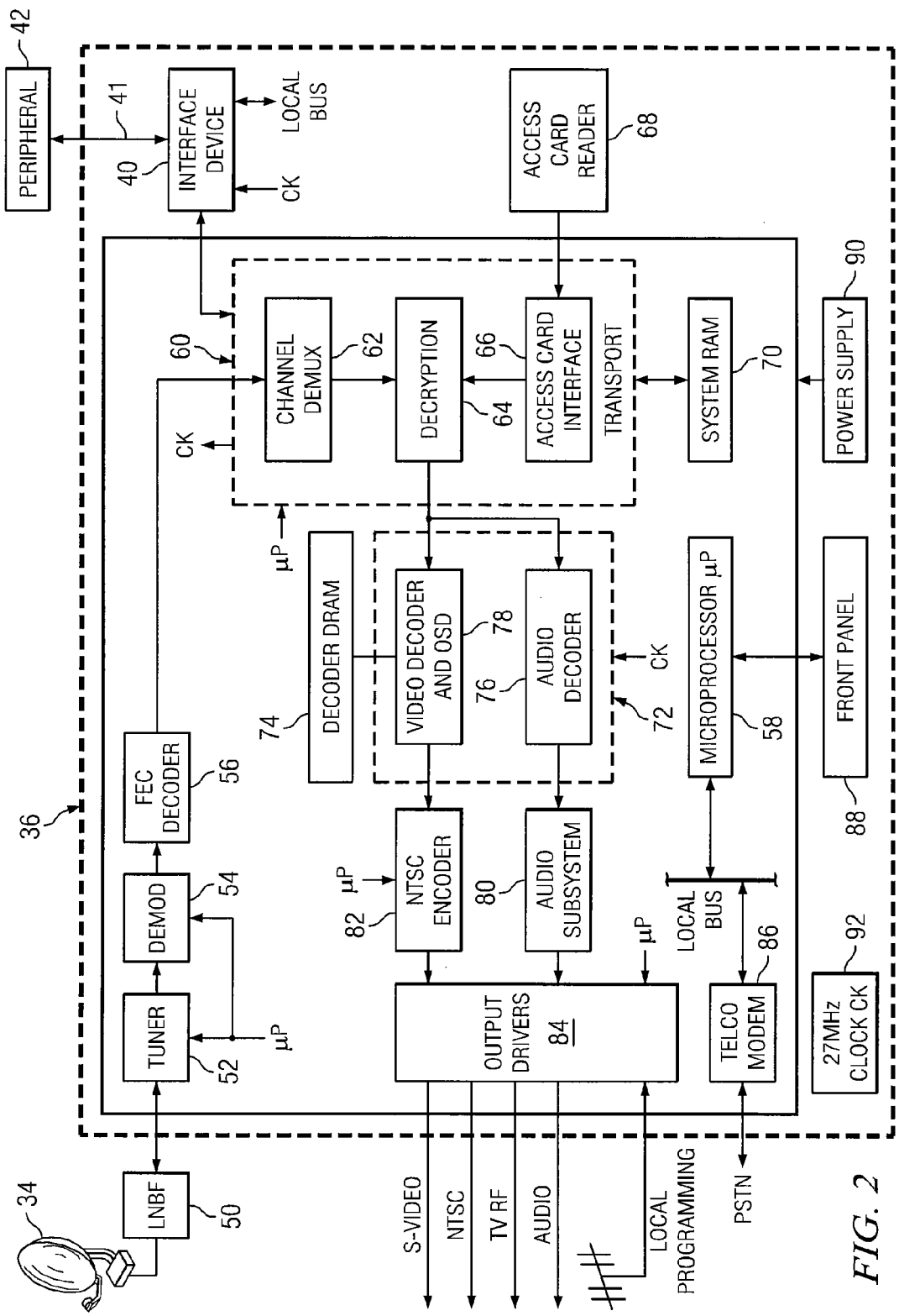
FIG. 2 is a block diagram illustrating more details of the receiver station of FIG. 1.

FIG. 2 is a more detailed block diagram of a portion of the receiver unit 36 shown in FIG. 1. Front-end circuitry inside the receiver unit 36 receives the L-band RF signals from the LNB 50 and converts them back into the original digital data stream. Decoding circuitry, receives the original data stream and performs video/audio processing operations such as demultiplexing and decompression. A microprocessor or CPU 58 controls the overall operation of the receiver unit 36, including the selection of parameters, the set-up and control of components, channel selection, and many other functions. The microprocessor 58 controls how digital objects (e.g., text, graphics) are processed (e.g., stored, displayed).

Each object preferably includes an object header and an object body. The object header identifies the object type, object ID and version number of the object. The object type identifies the type of the object. The various types of objects are discussed below. The object ID uniquely identifies the particular object from other objects of the same type. The version number of an object uniquely identifies the object from other objects of the same type and object ID. The object body may include data for constructing a portion of a program guide that is ultimately displayed on a user's television 38, and is also used for channel definition parameters.

The objects that are used for providing channel definition parameters may include boot objects, channel list objects, channel objects and conditional objects. Other objects, such as HTML (HyperText Markup Language) objects, are used to provide channel content. Still further objects, such as general program objects, general schedule objects and master schedule objects are used by the IRD 36 to generate a display of a program guide on a user's television 38.

A boot object identifies the service channel identification number(s) (SCIDs) where all other objects can be found. A boot object is always transmitted on the same channel, which means that each packet of data that makes up a boot object is marked with the same SCID number. Boot objects are transmitted frequently to ensure that IRDs 36 that have been shut off, and are then turned back on, quickly receive information indicating the location of the various program guide objects.

Each boot object includes frequency descriptors that define frequency tables. A frequency table lists frequencies and, for each frequency, a corresponding frequency index. Each frequency table lists frequencies and corresponding frequency indices for a single network. A network is a grouping of all channels from a common source, such as all satellite channels. Other networks include all NTSC channels or all ATSC channels. Thus, each channel frequency is represented by a particular frequency index number.

A channel list object contains a list of all the channel objects in a network. For each channel object in the list of channel objects, the channel list object includes a channel object ID for that channel object. Each channel object is uniquely identified by its channel object ID.

Each channel object includes multiple fields or descriptors that provide information about a particular channel. For example, each channel object may include fields for a "name", a "logo indicator" and a "logo index". Each descriptor in a channel object includes a descriptor type ID that indicates the type of the descriptor. For example, descriptor types may include "about" descriptors, "category" descriptors, "reserved" descriptors and "channel content" descriptors. The "about" descriptor provides a description of the channel. When there is no "about" descriptor, the description defaults to a message such as "No Information Available". The "category" descriptor provides a category classification for the channel. More than one "category" descriptor can appear in the channel object if the channel falls into more than one category. "Reserved" descriptors are saved for future improvements to the system.

Each channel object includes a variable length "channel definition" field. The channel definition field defines the composition of the channel, and is later used by IRDs 36 to reconstruct the channel components (e.g., audio, video and data). The channel definition field may include a plurality of sub-fields, and conditional logic that preferably consists of multiple "if-then" statements. Other entries may also be included in the channel composition table, such as a language preference. Channels may be comprised of ATSC, NTSC, HTML and/or other content.

In addition to defining channels as ATSC channels, NTSC channels, etc., channel content may also be explicitly defined. For channels that are explicitly defined, the following channel definition parameters are preferably used—service type parameter, transponder or channel number parameter, and SCID or program number parameter. The service type parameter indicates a type of service, such as an audio type (e.g., Dolby Digital AC3), video type (e.g., DAVID), channel type (e.g., NTSC or ATSC) or data type (e.g., high speed data). The transponder or channel number parameter identifies either an index in a frequency table for a DIRECTV network, or a channel number for an ATSC network or an NTSC network. The SCID or program number parameter identifies a SCID for a DIRECTV network, or a program number for an ATSC network.

Channel objects may also include a channel content descriptor. Channel content descriptors provide additional definitions of the channel. Channel content descriptors use conditional logic, such as "if-then" statements, to test various conditions. A set of "if-then" statements may be associated with each channel definition. If the condition or conditions in an "if-then" statement are satisfied, the channel definition associated with that "if-then" statement is used to define the channel content.

Another type of object is a conditional object. A conditional object contains an object that is preceded by a conditional expression. If the expression is evaluated to "TRUE", the object within is valid and is processed accordingly. If the expression is evaluated to "FALSE", the object within is ignored. A conditional object can contain multiple conditional expressions, so that it is processed only if all of the conditional expressions are evaluated to "TRUE".

Returning to FIG. 2, the illustrated IRD 36 includes a tuner 52, demodulator 54, FEC decoder 56, a micro-controller 58, a transport circuit 60, a channel demultiplexer 62, decryption circuit 64, an access card interface 66, an access card reader 68, a system RAM 70, an audio/video decoder circuit 72 having a random-access-memory (RAM) 74, audio decoder 76, video decoder 78, an audio digital-to-analog circuit 80, an NTSC (or other) encoder 82, output drivers 84, a modem connection 86, a front panel user interface 88, and a power supply 90, coupled together as illustrated. A 27 MHz clock signal generator 92 is also provided. The clock generator 92 generates a clock signal which is coupled to the audio/video decoder circuit 72 and which is frequency-calibrated by a signal received from the transport circuit 60, as shown.

The transport 60 receives the transport stream of digitized data packets containing video, audio, data, scheduling information, and other data. The digital packet information contains identifying headers as part of its overhead data. Under control of the microprocessor 58, the channel demultiplexer 62 filters out packets that are not currently of interest, and routes the data packets that are of interest through the decryption circuit 64 and, in the case of some packets, also through the access control circuits 66, 68 to their proper downstream destination. The decryption circuit 64 provides decryption for the data packets that have been encrypted. The access control circuits 66, 68 provide access control by any conventional means. For example, access control may be achieved by requiring a data packet to have a proper authorization code in order to be passed to the decryptor 64 and/or video decoder 78. The access card reader 68 can interface with an access card (not shown) that will receive the packet authorization code, determine its validity, and generate a code that confirms to the transport 60 that the subject data packet is authorized.

As program guide data are received and stored in memory 70, the microprocessor 58 performs various operations on the data in preparation for displaying a program guide and/or other content on the television 38. These operations include packet assembly, object assembly and object processing. During the packet assembly operation, the microprocessor 58 examines the stored program guide data and determines the locations of the packet boundaries.

During object assembly, the microprocessor 58 combines packets to create object frames, and then combines the object frames to create program guide objects. The microprocessor 58 examines the checksum transmitted within each object frame, and verifies whether the frame data was accurately received. If the object frame was not accurately received, it is discarded from memory 70. Also during the object assembly step, the IRD 36 discards assembled objects that are of an object type that the IRD 36 does not recognize. In order to accomplish this, each IRD 36 maintains a list of known object types in memory 70. The microprocessor 58 examines the object header of each received object to determine the object type. The microprocessor 58 then compares the object type of each received object to the list of known object types stored in memory 70. If the object type of an object is not found in the list of known object types, the object is discarded from memory 70.

During the object processing step, the objects stored in the guide database are combined to create a digital image of a program guide. The digital image of the program guide is later converted to an analog signal that is sent to television 38 for display to a user.

Figure 3:
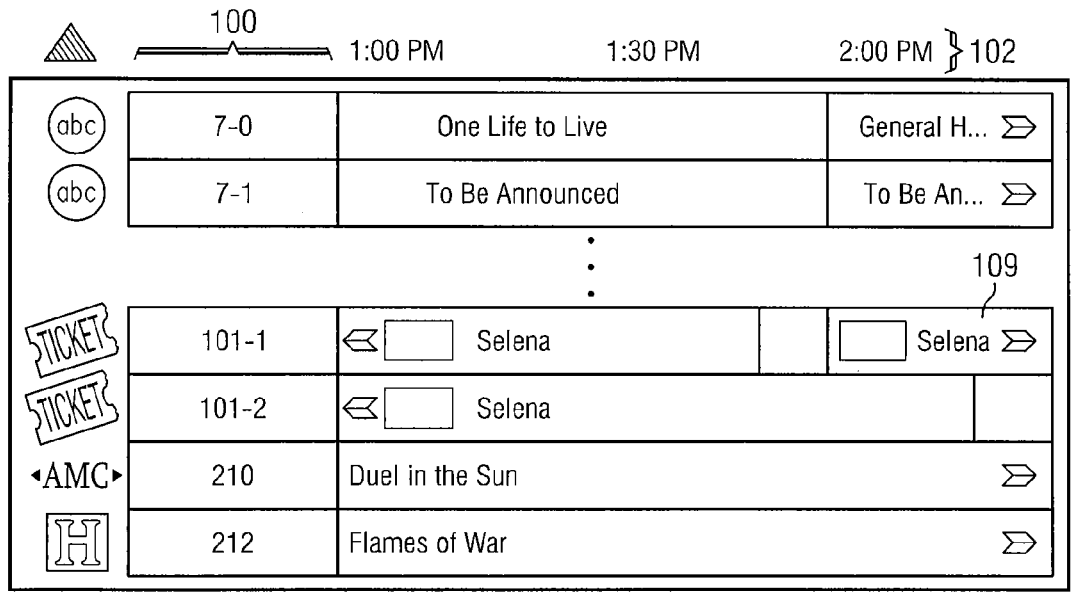
FIG. 3 is a block diagram illustrating a generic example of an electronic television program guide.

An example of an electronic program guide is illustrated in FIG. 3. Typically, channels 100 are listed in, e.g., numeric order vertically and times 102 are listed in chronological order horizontally. The grid boxes 104 in the body of the program guide are preferably filled with text and/or graphics representing television shows and/or other programming available at the associated time on the associated channel. Program guides may also include category buttons, scroll buttons, jump buttons, etc.

When a conditional object is received and stored in memory 70, the microprocessor 58 evaluates the conditional expression or expressions contained in the conditional object and processes the data in the conditional object only if the conditional expressions evaluate to "TRUE". An example of such a conditional expression is "if the receiver model number stored in memory 70 is 999999, then process the data in the conditional object." The microprocessor 58 evaluates this expression by comparing the receiver model number stored in the parameter table of memory 70, and processes the data in the conditional object only if the receiver model number is "999999". Similarly, conditional objects can be limited to use by receivers only in certain area codes or zip codes.

Figure 4:
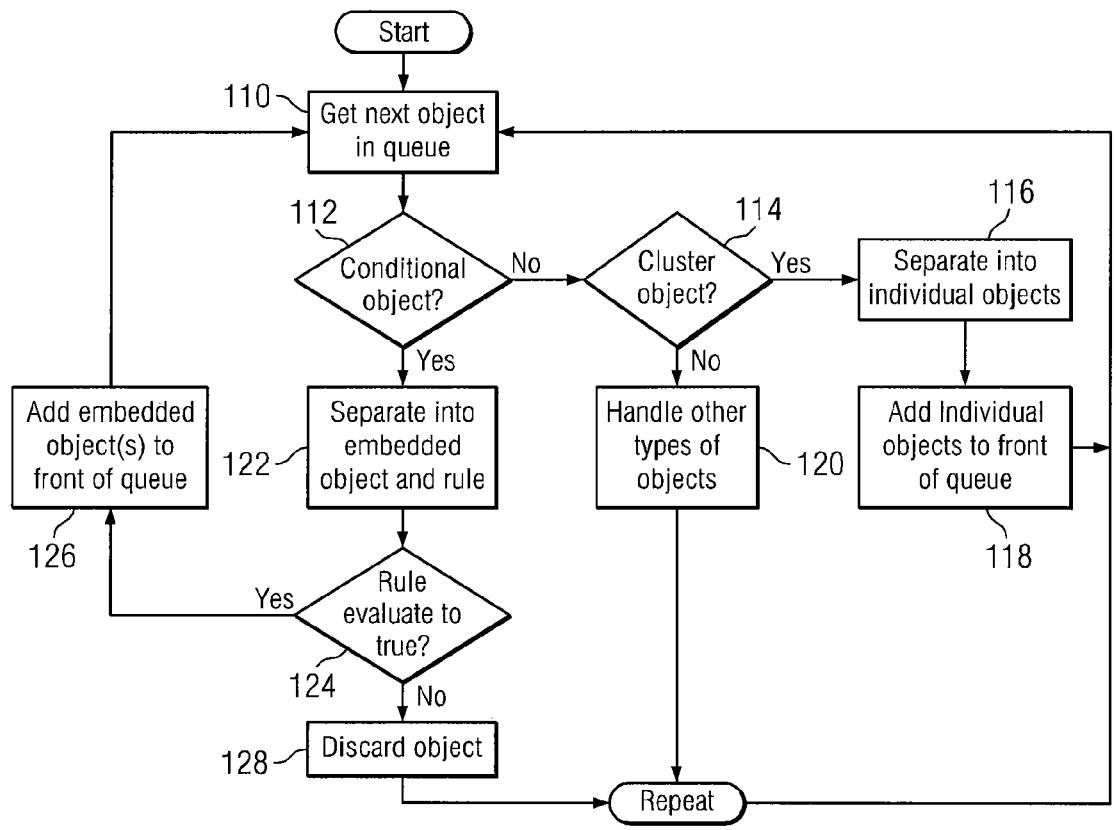
FIG. 4 is a flowchart illustrating a process for conditionally storing digital objects.

A flowchart of a program that can be implemented by the local receiver unit (IRD) 36 to conditionally store digital objects is illustrated in FIG. 4. The programmed steps may be performed by a control circuit such as a microprocessor 58. Once the program is initiated (e.g., a digital object has been received) the control circuit preferably retrieves an object from a queue of objects stored in memory 74 (block 110).

Digital objects may be addressed to a particular IRD 36 (e.g., by means of a geographic region ID, IRD number, CAM number, customer account number, etc.). Alternatively, digital objects may be addressed to a particular IRD 36 by a spatial time dimension, whereby the object is addressed to an IRD 36 by the amount of time coverage for which an IRD 36 has interests. Accordingly, there may be two dimensions to digital object addressing (e.g., geographic region and time).

Conditional objects (including conditional elements of other digital objects) introduce a third dimension, which is a computational expression that includes one or more variables associated with the state of the IRD 36. For example, a variable may include the amount, type or model of the IRD's hardware and/or software, settings in the IRD's CAM, and/or user preferences. The IRD's hardware and/or software configuration may involve the model of the IRD 36, the amount of physical RAM installed in the IRD 36 by either the factory or by the user, the amount of available RAM, whether the IRD software supports graphics, HTML, Java, or other capabilities, and whether there is a graphics or math coprocessor.

Upon receipt of a digital object, the control circuit examines the digital object to determine if it is a conditional object (block 112). For example, header information may be indicative of a predetermined object type. A conditional object is an object wrapped in a protocol containing a rule. If the digital object is not a conditional object, the control circuit examines the digital object to determine if it is a cluster object (block 114). A cluster object is a plurality of embedded objects wrapped in a cluster object protocol.

If the digital object is a cluster object, it is separated into the individual embedded objects it contains (block 116). This is accomplished by removing the wrapper according to its predefined protocol. Once the individual objects are separated from each other and from the cluster object wrapper, each of the individual objects is placed into the front of the object queue (block 118) and then operation repeats (block 110). If the digital object is not a cluster object (or a conditional object), it is handled in some manner consistent with that object type (e.g., stored in memory 74) (block 120). Subsequently, the method may repeat (block 110).

If the digital object is a conditional object, it is logically separated into an embedded object and a rule associated with the embedded object (block 122). Subsequently, the rule is evaluated (block 124). Rules preferably include a machine executable language, such as an interpreted programming language or a native machine language. For example, the rules may include logical operators such as NOT, AND, OR, XOR, etc. Further, the rules may include mathematical operators such as PLUS, MINUS, MULTIPLY, DIVIDE, etc. Still further, the rules may include comparison operators such as LESS_THAN, GREATER_THAN, EQUAL_TO, etc. Yet further, the rules may include branching operators such as IF, THEN, ELSE, etc. Additionally, the rules may include looping operators such as FOR, NEXT, UNTIL, etc. Moreover, the rules may include higher level operators to check IRD states, such as "If HDTV mode", "If 16×9 Aspect ratio", "If Authorized", "Compare Authorization Error", "Compare IRD Manufacturer", "Compare IRD Model", "Compare Local Time", "Compare UTC Time", etc. Complex scenarios can be tested. For example, a rule might state "if you are a Sony IRD manufactured before Jan. 1, 1998 with <1 MB of RAM, then do not save this object".

If the embedded rule evaluates to FALSE, then the object may be discarded to conserve memory 74 (block 128, and the method may repeat (block 110). For example, if the embedded object represents a component in a help screen for IRDs 36 manufactured by A, but this IRD 36 is manufactured by B, then a rule could test for such a condition and discard the object to conserve memory 74. However, if the embedded rule evaluates to TRUE, the embedded object is preferably stored by adding it to the front of the queue (block 126).

Figure 5:
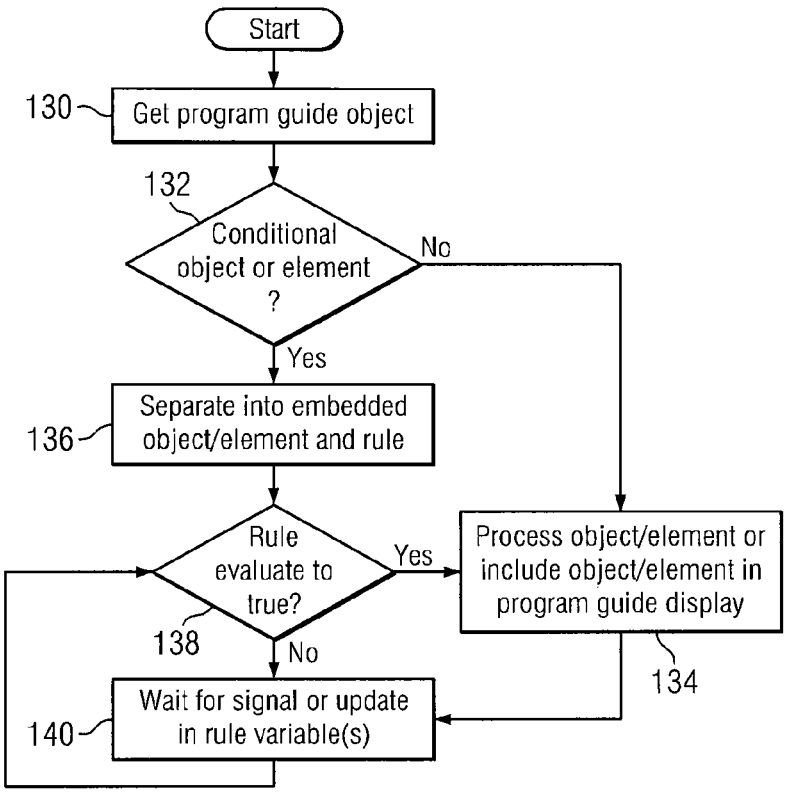
FIG. 5 is a flowchart illustrating a process for conditionally displaying program guide objects.

A flowchart of a program that can be implemented by the local receiver unit (IRD) 36 to conditionally display or process program guide objects is illustrated in FIG. 5. Again, the programmed steps may be performed by a control circuit such as a microprocessor 58. Once the program is initiated (e.g., a command to display the program guide is received) the control circuit preferably retrieves a program guide object from memory 74 (block 130).

The control circuit then examines the program guide object to determine if it is a conditional object or if it has a conditional element (block 132). As before, header information may be indicative of a predetermined object type. For example, a header may indicate a particular object is a conditional object, or a header may indicate the associated object contains one or more conditional elements. A conditional object is an object wrapped in a protocol containing a logical rule. A conditional element is a portion of a digital object where the object portion is wrapped in a protocol containing a logical rule. If the program guide object is not a conditional object, the control circuit preferably includes it in the program guide by default and/or tests other conditions such as access privileges (block 134).

If the digital object contains a conditional object or a conditional element, that object or element is logically separated into an embedded object or element and a rule associated with that embedded object or element (block 136). Subsequently, the rule is evaluated (block 138). As mentioned in detail above, rules preferably comprise a language, such as an interpreted programming language or a native machine language. If the embedded rule evaluates to FALSE, then the object is not displayed or processed in the program guide at that time. Subsequently, the control circuit waits for a signal to re-evaluate and/or an update to one or more variables included with the rule (block 140) and then returns to re-evaluate the rule (block 138). For example, the rule might test whether the user has permission for a particular movie or sports package, and, if not, refrain from displaying program guide data associated with those optional programming packages until the user has permission. However, if the embedded rule evaluates to TRUE, the embedded program guide object or element is further to processed or displayed in the program guide (block 134) before the program is exited.

Unlike conditional objects in general, which have their rule(s) evaluated once upon object arrival at the IRD 36, conditional guide and channel content rules are evaluated when any variable in the rule is updated, as mentioned above. This includes but is not limited to CAM state, video decryption validity, and/or user preference. CAM state includes region bit values, subscribed channel packages, etc. Video decryption validity includes whether the channel can be successfully decrypted by the IRD 36, which is a function of the CAM's authorized packages as well as the encryption key used by the broadcaster and/or blackout regions specified in the encryption method. User preferences include choices made by the user such as a list of excluded or preferred channels, user preferred movie genres, favorite actors, rating lock limit, etc.

When the guide display includes conditional program objects, the IRD 36 display may include only those channels and program objects with rules evaluating to TRUE. Upon a change in any variable employed by those conditional objects in the current guide display, the rules must be reevaluated and the display updated to again reflect only those channels and/or programs which evaluate to true.

When a channel with conditional content is being actively decoded, the same concept applies. Upon tuning a channel with conditional content, the IRD 36 evaluates the rules to determine the highest priority content with a content rule that evaluates to TRUE. When two or more rules evaluate to TRUE, the content which has a highest priority is actually processed. Priority is preferably represented in simple list order, so that the content associated with the first rule evaluating to TRUE is used and the rule evaluation can stop. Once the variables used in the content rules are changed, the content rules are again reevaluated until a rule is found to be TRUE. Preferably, only the variables used by the currently selected content and those of the higher priority content rules are used to trigger a reevaluation of the content expressions.

Figure 6:
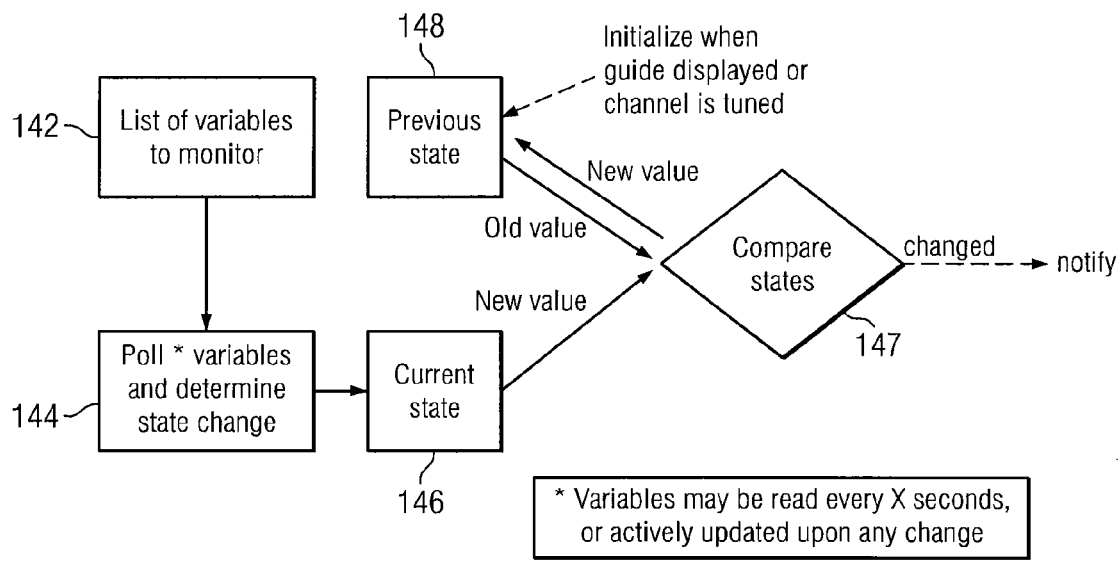
FIG. 6 is a block diagram illustrating a process for monitoring variables for state changes in order to trigger a re-evaluation of rules.

A block diagram illustrating one embodiment of a method to monitor variables for state changes in order to trigger such a re-evaluation of a rule or rules is illustrated in FIG. 6. First, a list of variables to monitor is composed (block 142). For example, all variables or all variables of a certain type may be listed in a data structure in memory. Subsequently, the list of variables is polled to determine if any of the variables has changed states (block 144). In order to make such a determination, the current state (block 146) and the previous state (block 148) of each variable are provided to a decision block (block 147). The decision block 147 compares the current (or potentially new) value with the previous (or potentially old) value. If the values are the same, no action is taken and the next variable in the list is polled. If the values are different, the new value is stored by the block 148 and a signal to re-evaluate the rule(s) is issued. Subsequently, any updates to the conditional object and/or the rules initiates a re-evaluation at block 142.

Figure 7:
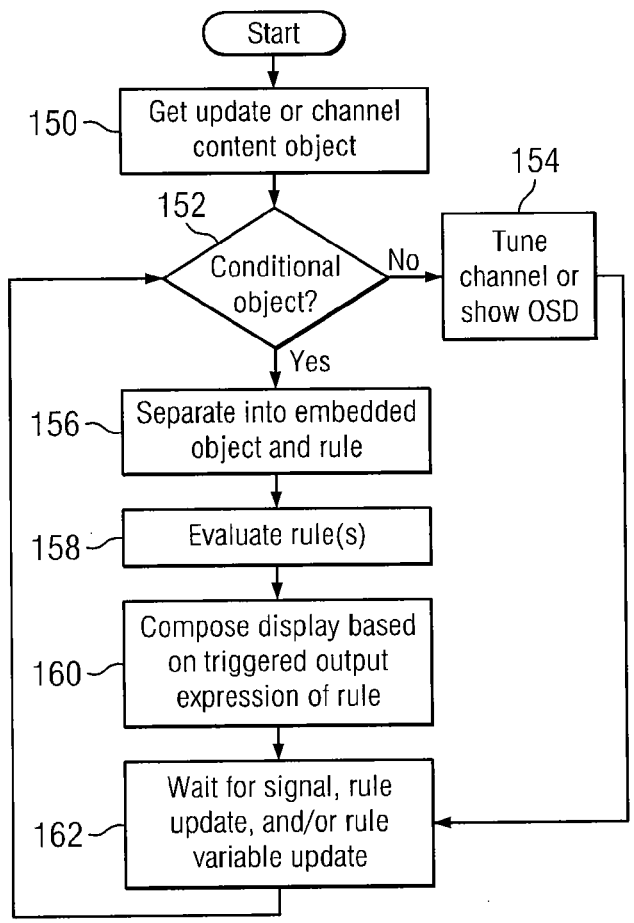
FIG. 7 is a flowchart illustrating a process for conditionally composing the content of a channel.

A flowchart of a program that can be implemented by the local receiver unit (IRD) 36 to conditionally display content associated with a channel is illustrated in FIG. 7. Again, the programmed steps may be performed by a control circuit such as a microprocessor 58. Once the program is initiated (e.g., a command to display a particular channel is received) the control circuit preferably retrieves a channel content object associated with the current channel from memory 74 (block 150).

The control circuit then examines the channel content object to determine if it is a conditional object (block 152). As before, header information may be indicative of a predetermined object type. For example, a header may indicate a particular object is a conditional object. If the channel content object is not a conditional object, the control circuit preferably tunes the receiver to a predetermined video and/or audio source by default and/or tests other conditions such as access privileges and displays a screen display, e.g., an on-screen display (OSD). The OSD typically comprises a text message (block 154).

If the channel content object is a conditional object, it is logically separated into an embedded object and a rule associated with the embedded object (block 156). Subsequently, the rule is evaluated (block 158). As mentioned above, rules preferably comprise a language, such as an interpreted programming language or a native machine language. Preferably, the rule is arranged to test one or more conditions and trigger an output (e.g., a series of IF-THEN-ELSE like statements). Accordingly, a display is composed based on the triggered output expression(s) (block 160). For example, a particular pay-per-view event may be blocked out until stadium attendance reaches a certain threshold. Rules, associated with that channel, could display a series of graphics depicting progress toward that threshold, followed by the video/audio if the threshold is passed. Subsequently, the control circuit waits for a signal to re-evaluate the rule, an update to one or more rules, and/or an update to one or more variables included with the rule (block 162) and then returns to block 152.

Figure 8:
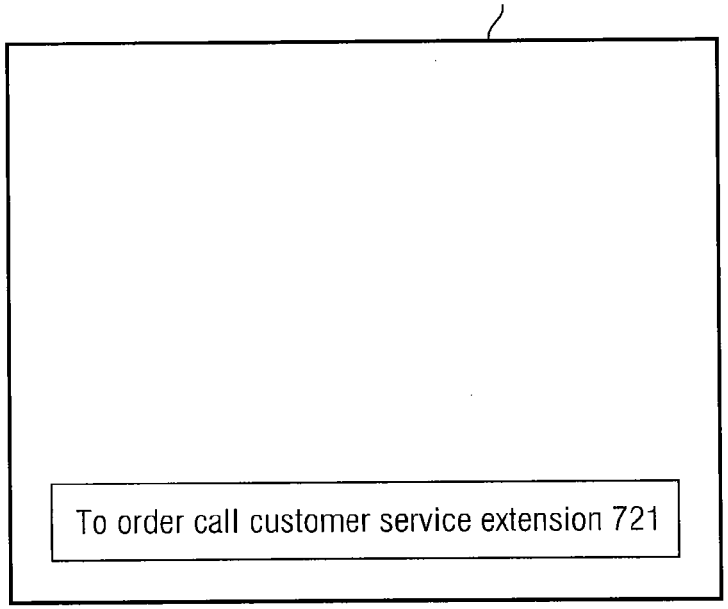
FIG. 8 is an example of conditional television channel content that is displayed on the television screen of a user that does not subscribe to the selected channel.

One application of conditional objects will be discussed with reference to FIG. 8 and FIG. 9. Assume for this application that a first user subscribes to HBO and receives HBO programming on channel 910, and that a second user does not subscribe to HBO. If the first user tunes to channel 910, the user will be shown HBO programming. In contrast, if the second user tunes to channel 910, the user will be shown a screen similar to screen 200 shown in FIG. 8. Screen 200 is a generic screen that is typically stored in the IRD 36 and shown anytime the user tunes to a channel that is not part of the user's subscription. Rather than providing generic screens such as screen 200, conditional channel definitions may be used to provide more elaborate television content that is more focused to individual users and their subscriptions.

Figure 9:
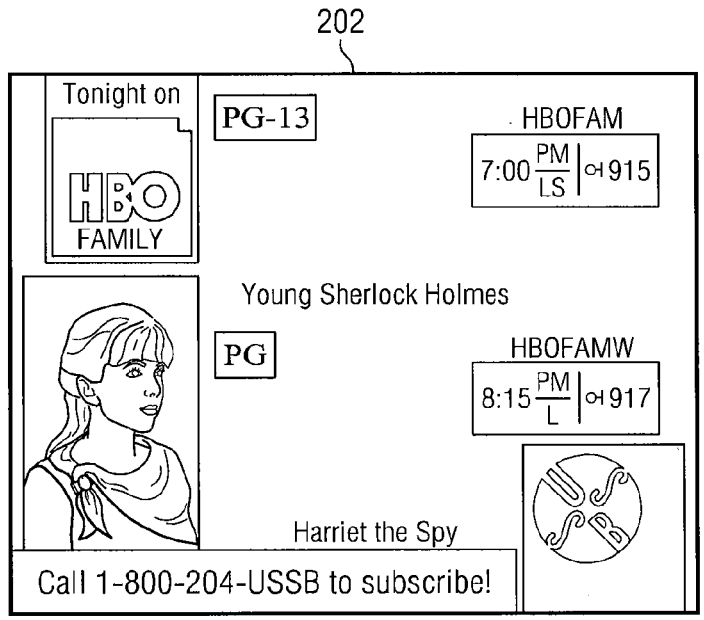
FIG. 9 is an example of conditional television channel content that is displayed on the television screen of a user that does subscribe to the selected channel.

FIG. 9 shows an example of a screen generated using a conditional channel definition. Using the example above, when the second user tunes to channel 910, rather than showing a generic "please subscribe message", the user is shown screen 202, which consists of an advertisement for HBO, including pictures or clips from movies that are currently showing or that will be shown in the near future. In contrast to the generic message of screen 200, the channel content shown in screen 202 is specifically targeted to HBO information. Also, the content can be varied according to users' subscriptions. For instance, if the second user subscribed to Showtime but not HBO, the advertisement shown to the second user could promote a reduced-price package deal of HBO and Showtime. Thus, the channel content is conditional and can be varied in accordance subscription information.

In addition to varying channel content based on subscription information, channel content can be varied according to receiver characteristics and/or past viewing habits. For example, a web page with advertising and hyperlinks to additional information about HBO could be displayed if the receiver includes the ability to generate web pages. In another example, the advertising could be varied based upon a user's favorite types of programs. Other receiver characteristics that may be used in varying television content include the model number of the receiver, the amount of available memory in the receiver, ratings restrictions or other content restrictions that have been entered by a user, display preferences that have been entered by a user (e.g., the length of movie titles or actor names, the language in which text is displayed, etc.) and the geographic location of the receiver.

The conditional content illustrated in FIG. 9 is accomplished using the techniques described above. The channel object for channel 910, or the HBO channel, will include multiple channel definitions with conditional logic associated with the channel definitions. When a user tunes to channel 910, the microprocessor 58 evaluates the conditional logic associated with the channel definitions for channel 910 and identifies the appropriate channel definition. If the conditional logic is based on subscription information (e.g., "If the user does not subscribe to HBO, use the HBO advertisement content" or "If the user does not subscribe to HBO but does subscribe to Showtime, use is the HBO+Showtime package deal advertisement content"), the microprocessor 58 examines memory 70, which holds subscription information, to evaluate the conditional expressions. Similarly, if the conditional logic is based on characteristics of the IRD 36 or past viewing habits, the microprocessor 58 examines memory 70, which holds information regarding receiver characteristics and a user's past viewing habits, to evaluate the conditional expressions.

In addition to varying television channel content based on subscription information, receiver characteristics, and past viewing habits, the content of television channels can also be varied in time. For example, assume that a television broadcast system uses a commercial offerings channel that advertises the various television channel offerings for the system. Using the techniques of the present invention, the content of the commercial offerings channel can be varied to show the content of multiple channels at different points in time. As a more specific example, the commercial offerings channel could show content from an HBO channel for a first hour, content from a Showtime channel for second hour, and content from The Movie Channel for a third hour. Thus, the channel identifier (e.g., channel 360) stays the same and the channel definition varies from time to time.

Rather than transmitting the audio and video signals for each of these channels multiple times (e.g., one for the particular channel itself and one for the commercial offerings channel), the channel parameters for the commercial offerings channel are varied and made the same as the HBO channel for the first hour, same as the Showtime channel for the second hour, etc. Therefore, the audio and video signals for the selected channel are associated with both the channel itself and the commercial offerings channel. The channel parameters for the commercial offerings channel are varied by using multiple channel definitions and conditional logic. The conditional logic is based on the current time at the location of the IRD 36. To illustrate, the conditional logic would be something like the following: "If the current time is between 7:00 p.m. and 8:00 p.m., use the same channel parameters as the HBO channel". Similar conditional tests would be used for later times and other channels. The microprocessor 58 compares the times in the conditional tests to the current local time, and determines which condition is satisfied and correspondingly which channel definition to use.

The conditional logic associated with a particular channel definition may include multiple conditional tests. For instance, the conditional logic may include tests regarding the current time and the user's subscription information. Channel parameters would then be varied to allow multiple classes of viewers to view the same channel content for a short period of time, without sending the content multiple times. To illustrate this technique, assume that HBO offers one showing of a program, such as a professional to boxing match, for commercial users that resell the channel content to others. Residential subscribers to HBO obtain access to the boxing match as part of their subscription. Assuming the commercial users' channel is channel 800, assuming the residential subscribers' HBO channel is 910, and assuming the boxing match is scheduled to take place between 7 p.m. and 10 p.m., the parameters of channel 800 would be changed at 7 p.m. to be the same as for channel 910. At 10 p.m., the parameters would be changed back. Therefore, the channel object associated with channel 800 would include conditional logic that tests whether the subscriber is a commercial subscriber and tests whether the time is between 7 p.m. and 10 p.m. If both tests are satisfied, the parameters for channel 910 are used. If either test is not satisfied, the normal parameters for channel 800 are used.

Figure 10:
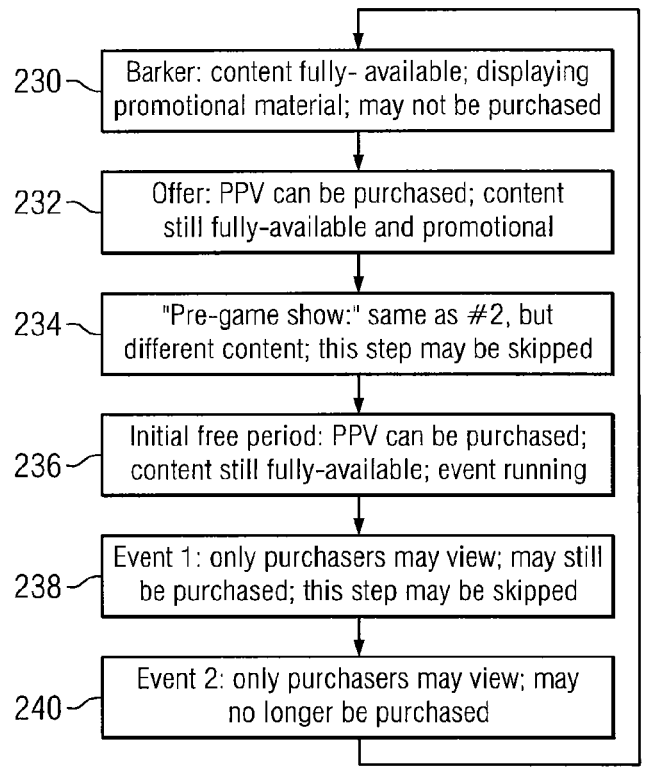
FIG. 10 is a block diagram of typical stages of a pay per view event.

Pay per view cycling is another example of an application that can make use of the conditional channel techniques of the present invention. Pay per view cycling refers to the stages that a particular pay per view channel goes through at various points in time. Pay per view events, such as movies or boxing matches, are typically divided into six stages, although the number of stages may be varied according to the type of pay per view event and the implementation of the system. The six stages of a typical pay per view event are shown in FIG. 10.

The first stage of a pay per view cycle, which is represented by block 230, is a barker stage. During the barker stage, highlights of the pay per view event are shown. Highlights of pay per view events on other channels may also be shown. The barker stage typically begins several days before the pay per view event is scheduled to start. During the barker stage, the pay per view event can not be purchased. All users may view the channel content during the barker stage.

The second stage (block 232) is referred to as the offer. During the offer stage, the same promotional material as the barker stage is shown, but users are allowed to purchase the pay per view event during the offer stage. The offer stage typically begins one day before the pay per view event is scheduled to start. All users may view the channel content during the offer stage.

The third stage (block 234) is referred to as the pre-game show. During the pre-game show stage, promotional material is again shown, but the content of the promotional material is typically different than the promotional material shown during the first two stages. The pre-game show stage typically begins one hour before the event is scheduled to begin. Users may purchase the pay per view event during the pre-game show. All users may view the channel content during the pre-game show stage.

The fourth stage (block 236) is referred to as the initial free period stage. The initial free period marks the beginning of the pay per view event. The initial free period begins when the pay per view event begins, and typically lasts about five minutes. During the initial free period, users may still purchase the pay per view event. All users may view the pay per view event during the initial free period.

The fifth stage (block 238) is the event stage. During the event to stage, only those users that have purchased the pay per view event can view the event. The users that have not purchased the event will either be shown a blank screen or a promotional screen. During the event stage, the pay per view event may still be purchased. The event stage typically lasts from the end of the initial free period until about 30 minutes into the event.

The sixth event (block 240) is the secondary event stage. During the secondary event stage, only those users that have purchased the pay per view event can view the event. The users that have not purchased the event will either be shown a blank screen or a promotional screen. During the secondary event stage, the pay per view event may no longer be purchased. The secondary event stage typically lasts from the end of the event stage until the end of the event. At the end of the event, the cycle starts over and the barker stage for the next pay per view event begins.

A channel object for a pay per view channel includes at least one channel definition for each of the six stages shown in FIG. 10. Each of the channel definitions are associated with a conditional test that compares the scheduled time of the event to the current time at the receiver (e.g., "If the difference between the scheduled time of the event and the current time at the receiver is greater than one day, use the channel definition for the first stage—block 230). For the fifth and sixth pay per view cycle stages (blocks 238 and 240), the channel object includes two channel definitions for each stage. One channel definition defines the channel content for users that have purchased the event, and the other channel definition defines the channel content for users that have not purchased the event. For the fifth and sixth to stages, then, in addition to using a conditional test to compare the scheduled time of the event to the current time and identifying the current stage, another conditional test is used to identify whether the user has purchased the event or not.

When the IRD 36 receives a channel object for a pay per view channel, the IRD 36 stores the channel object in memory 70. The microprocessor 58 may then periodically evaluates the conditional tests contained in the pay per view channel objects and identifies the appropriate channel definition for the current time. A user purchases a particular pay per view event using remote control 86. The user's choice is received by IR receiver 84, transferred to logic circuit 80 and then stored in memory 78. Other than the title of the program purchased, memory 78 may store additional information about purchased programs, such as event start time and end time, and price. Receiver 64 periodically calls transmission station 26 and downloads pay per view purchase information. The pay per view purchase information is output through interface 82, which is coupled to a telephone line.

The present invention also provides for the transmission, receipt and display of conditional messages. Conditional messages are broadcast to all receivers, and only those receivers that satisfy certain conditions display the message to users. As with the conditional channel content, each receiver evaluates conditional expressions associated with the messages and identifies messages that are appropriate for display. The conditional message is overlaid on the channel content currently being viewed by a user. Conditional messages are transmitted as a conditional object that includes the text of the message and conditional logic. Conditional objects containing conditional messages are stored in memory 70. The conditional logic includes a series of tests that the IRDs 36 evaluate to determine if the message is appropriate for display.

The conditional logic for a message may include a geographic location test (e.g., "If the user is in zip code 55166, display the following message"). The geographic location test may be defined by area code, zip code, or a geographic area may be broken down into geographic regions, with each region assigned a unique code. Each IRD 36 stores data representing the geographic region of that IRD 36 in memory 70.

Other examples of conditional messages include billing messages (e.g., "Your bill is due, please call this number 1-800-PAY-BILL to make payment arrangements"), pay per view messages (e.g., "You purchased the Tyson-Holyfield fight, it starts in 5 minutes on channel 320"). For billing messages, memory 70 preferably stores the account status for the user of the IRD 36. When the IRD 36 receives a conditional object containing a billing message, the microprocessor 58 looks at the current account status stored in memory 70 and determines whether payment is past due. If payment is past due, the microprocessor 58 causes the billing message to be transferred from memory 70 to the television 38.

Custom messages may also be directed to users based on their subscriptions. For example, if a content provider were offering a package deal of Cinemax and HBO for a special price, an advertising message could be broadcast along with conditional logic indicating that the message is intended for those users that subscribe to HBO only, or that subscribe to Cinemax only, and is not intended for subscribers that subscribe to Showtime.

Custom messages may also be based on past viewing habits. For example, a message can be directed to all users who like comedy romances (e.g., "Catch the premier of My Best Friend's Wedding, starting at 8 p.m. on channel 310"). The conditional logic associated with such a message may include a test that requires the IRD 36 to look at the user's viewing history. The conditional logic may indicate that the message is appropriate for display only if the user has watched a threshold number of comedy romances. Alternatively, the conditional logic may indicate that the message is appropriate for display only if comedy romances are the type of movie watched most often by the user. When an IRD 36 receives a message that includes conditional logic regarding a user's past viewing habits, the microprocessor 58 examines a selection history table stored in memory 70.

In summary, persons of ordinary skill in the art will readily appreciate that a conditional object storage and display system and method have been provided. Users of systems implementing the teachings of the present invention can enjoy flexible display of data and increased memory efficiency.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. An apparatus for conditionally processing digital objects addressed to a receiver/decoder in a satellite television system comprising:
a satellite signal receiver for receiving a digital object from a satellite;
a memory for storing the digital object; and,
a control circuit operatively coupled to the receiver and the memory for determining if the digital object is a conditional object, wherein conditional objects are objects which include a rule and an embedded object, the embedded object including content used to construct a program guide at the receiver/decoder, the control circuit logically separating the embedded object from the rule if the digital object is a conditional object, the control circuit executing a machine executable instruction included in the rule of the conditional object to display the digital object in the program guide if the rule evaluates to true and, if the rule evaluates to false, to detect a change in a state of a variable utilized in the rule and, in response to the change, re-evaluate the rule, wherein the machine executable instruction in the rule includes a branching operator and is from at least one of an interpreted programming language or a native machine language.

2. The apparatus as defined in claim 1, wherein the control circuit discards the digital object to conserve memory if the rule evaluates to false, and the control circuit stores the digital object in the memory if the rule evaluates to true.

3. The apparatus as defined in claim 1, wherein the control circuit displays the digital object if the rule evaluates to true, and waits a period of time before re-evaluating the rule if the rule evaluates to false.

4. The apparatus as defined in claim 3, wherein the period of time is a predetermined period of time.

5. The apparatus as defined in claim 3, wherein the period of time is determined by the variable in the rule being updated.

6. The apparatus as defined in claim 1, wherein the digital object is used to compose content of a television channel.

7. The apparatus as defined in claim 1, wherein the control circuit determines if the digital object is a conditional object by examining header information indicative of a predetermined object type.

8. The apparatus as defined in claim 1, wherein the digital object comprises a plurality of embedded objects wrapped in a cluster protocol.

9. A method for conditionally storing digital objects comprising the steps of:
retrieving a digital object from memory, the digital object having been received from a television distribution system;
determining if the digital object is a conditional object, wherein conditional objects are objects which include a rule and an embedded object, the embedded object including content used to construct a program guide at a receiver/decoder, the rule indicating if the embedded object should be discarded, wherein the rule included in the conditional object includes a machine executable instruction comprising a branching operator;
logically separating the embedded object from the rule if the digital object is a conditional object;
executing the machine executable instruction included in the rule of the conditional object to determine if the digital object should be discarded;
detecting a change in a state of a variable utilized in the rule if the rule evaluates to false;
in response to the change, re-evaluating the rule;
discarding the digital object if the rule evaluates to false to conserve memory; and,
storing the digital object if the rule evaluates to true.

10. A The method as defined in claim 9, wherein the digital object is used to compose content of a television channel.

11. The method as defined in claim 9, wherein the digital object is addressed to an integrated receiver/decoder for use in a satellite television system.

12. The method as defined in claim 9, wherein the determining step comprises examining header information indicative of a predetermined object type.

13. The method as defined in claim 9, wherein the digital object comprises a plurality of embedded objects wrapped in a cluster protocol.

14. A method for conditionally displaying digital objects comprising the steps of:
retrieving a digital object from memory, the digital object having been received from a television distribution system;
determining if the digital object is a conditional object, wherein conditional objects are objects which include a rule and an embedded object, the embedded object including content used to construct a program guide at a receiver/decoder, the rule indicating if the embedded object should be displayed, wherein the rule included in the conditional object includes a machine executable instruction comprising a branching operator;
logically separating the embedded object from the rule if the digital object is a conditional object;
executing the machine executable instruction included in the rule of the conditional object to determine if the digital object should be displayed;
waiting a period of time before re-evaluating the rule if the rule evaluates to false;
detecting a change in a state of a variable utilized in the rule if the rule evaluates to false;
in response to the change, re-evaluating the rule;
discarding the digital object if the rule evaluates to false to conserve memory; and
displaying the digital object in the program guide if the rule evaluates to true.

15. The method as defined in claim 14, wherein the digital object is used to compose content of a television channel.

16. The method as defined in claim 14, wherein the digital object is addressed to an integrated receiver/decoder for use in a satellite television system.

17. The method as defined in claim 14, wherein the determining step comprises examining header information indicative of a predetermined object type.

18. The method as defined in claim 14, wherein the period of time is a predetermined period of time.

19. The method as defined in claim 14, wherein the period of time is determined by a variable in the rule being updated.

20. A method for conditionally displaying a portion of a digital object comprising the steps of:
retrieving a digital object from memory, the digital object having been received from a television distribution system;

determining if the digital object includes a conditional element, wherein conditional elements are portions of digital objects wrapped in a protocol containing a rule, the rule indicating if the portion of the digital object should be displayed, wherein the rule included in the conditional element includes a machine executable instruction comprising a branching operator, the digital object including an embedded object that includes content used to construct a program guide at a receiver/decoder;

logically separating the portion from the rule if the digital object includes a conditional element;

executing the machine executable instruction included in the rule of the conditional element to determine if the portion should be displayed;

waiting a period of time before re-evaluating the rule if the rule evaluates to false;

detecting a change in a state of a variable utilized in the rule if the rule evaluates to false;

in response to the change, re-evaluating the rule;

discarding the digital object if the rule evaluates to false to conserve memory; and displaying the portion in the program guide if the rule evaluates to true.

21. A method for conditionally processing a portion of a digital object comprising the steps of:

retrieving a digital object from memory the digital object having been received from a television distribution system;

determining if the digital object includes a conditional element, wherein conditional elements are portions of digital objects wrapped in a protocol containing a rule, the rule indicating if the portion of the digital object should be processed, wherein the rule included in the conditional element includes a machine executable instruction comprising a branching operator, the digital object including an embedded object that includes content used to construct a program guide at a receiver/decoder;

logically separating the portion from the rule if the digital object includes a conditional element;

executing the machine executable instruction included in the rule of the conditional element to determine if the portion should be processed;

discarding the digital object if the rule evaluates to false to conserve memory;

processing the portion if the rule evaluates to true to display the portion in the program guide;

after evaluating the rule, monitoring a variable identified in the rule for changes; and in response to the monitoring detecting a change in the variable, re-evaluating the rule.

* * * * *